(12) United States Patent
Koren et al.

(10) Patent No.: US 7,065,087 B2
(45) Date of Patent: Jun. 20, 2006

(54) PERFORMING COMPRESSION OF USER DATAGRAM PROTOCOL PACKETS

(75) Inventors: Tmima Koren, Cupertino, CA (US); Walter L. Robinson, Raleigh, NC (US); Jagdish V. Sonti, Cupertino, CA (US); Nathan A. Mitchell, Siler City, NC (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 10/706,640

(22) Filed: Nov. 12, 2003

(65) Prior Publication Data

US 2005/0008012 A1    Jan. 13, 2005

Related U.S. Application Data

(60) Provisional application No. 60/485,405, filed on Jul. 8, 2003.

(51) Int. Cl.
    *H04L 12/56* (2006.01)
    *H04J 3/24* (2006.01)
    *H04J 3/18* (2006.01)

(52) U.S. Cl. .................. 370/394; 370/474; 370/477

(58) Field of Classification Search ............... 370/252, 370/389, 392, 349, 395.52, 401, 471, 474, 370/477, 521; 709/247
See application file for complete search history.

(56) References Cited

U.S. PATENT DOCUMENTS

| | | | | |
|---|---|---|---|---|
| 6,608,841 | B1 * | 8/2003 | Koodli | 370/474 |
| 6,618,757 | B1 * | 9/2003 | Babbitt et al. | 709/226 |
| 6,680,955 | B1 * | 1/2004 | Le | 370/477 |
| 6,711,164 | B1 * | 3/2004 | Le et al. | 370/392 |
| 6,751,209 | B1 * | 6/2004 | Hamiti et al. | 370/349 |
| 6,788,675 | B1 * | 9/2004 | Yang | 370/352 |
| 6,791,982 | B1 * | 9/2004 | Westberg | 370/392 |
| 6,967,964 | B1 * | 11/2005 | Svanbro et al. | 370/437 |
| 2002/0038385 | A1 * | 3/2002 | Kalliokulju | 709/247 |
| 2002/0057716 | A1 * | 5/2002 | Svanbro et al. | 370/477 |
| 2002/0071432 | A1 * | 6/2002 | Soderberg et al. | 370/389 |
| 2002/0097722 | A1 * | 7/2002 | Liao et al. | 370/392 |
| 2003/0123485 | A1 * | 7/2003 | Yi et al. | 370/477 |
| 2004/0125817 | A1 * | 7/2004 | Miyazaki et al. | 370/411 |
| 2005/0008037 | A1 * | 1/2005 | Koren et al. | 370/474 |

OTHER PUBLICATIONS

Westphal, "A User-based Frequency-dependent IP Header Compression Architecture", Nov. 2002, pp. 17-21.*
Casner, S., et al., "*Compressing IP/UDP/RTP Headers for Low-Speed Serial Links*", Network Working Group, Category: Standards Track, RFC 2508 (RFC2508), http://www.faqs.org/rfcs/rfc2508.html, 19 pages.

* cited by examiner

*Primary Examiner*—Hassan Kizou
*Assistant Examiner*—Hong Sol Cho
(74) *Attorney, Agent, or Firm*—Baker Botts L.L.P.

(57) ABSTRACT

Performing compression includes receiving at a compressor a flow comprising packets, where each packet has a packet identifier. The packet identifiers are associated with a predetermined increment, but any change in the predetermined increment is ignored. The packets are compressed, and the flow is transmitted to a decompressor.

21 Claims, 3 Drawing Sheets

PERFORMING COMPRESSION OF USER DATAGRAM PROTOCOL PACKETS

RELATED APPLICATION

This application claims benefit under 35 U.S.C. § 119(e) of U.S. Provisional Application Ser. No. 60/485,405, entitled "UDP HEADER COMPRESSION," filed Jul. 8, 2003.

TECHNICAL FIELD OF THE INVENTION

This invention relates generally to the field of communications and more specifically to performing compression of User Datagram Protocol packets.

BACKGROUND OF THE INVENTION

Known techniques may be used to compress User Datagram Protocol (UDP) packets. In the event of packet loss, the known techniques may perform certain packet loss procedures. These procedures, however, may exacerbate the packet loss. Accordingly, known techniques for compressing User Datagram Protocol packets may be unsatisfactory in certain situations.

SUMMARY OF THE INVENTION

In accordance with the present invention, disadvantages and problems associated with previous techniques for compressing User Datagram Protocol (UDP) packets may be reduced or eliminated.

According to one embodiment of the present invention, performing compression includes receiving at a compressor a flow comprising packets, where each packet has a packet identifier. The packet identifiers are associated with a predetermined increment such as the delta IP ID, but any change in the predetermined increment is ignored. The packets are compressed, and the flow is transmitted to a decompressor.

Certain embodiments of the invention may provide one or more technical advantages. A technical advantage of one embodiment may be that any changes in a predetermined increment between packet identifiers of successive packets may be ignored by the compressor, and that skips in the sequence number may be accepted by the decompressor without invalidating the context. These procedures may save available bandwidth and may reduce packet loss. Another technical advantage of one embodiment may be that the use of a context identifier between the compressor and the decompressor may be synchronized, which may reduce or eliminate flow corruption.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
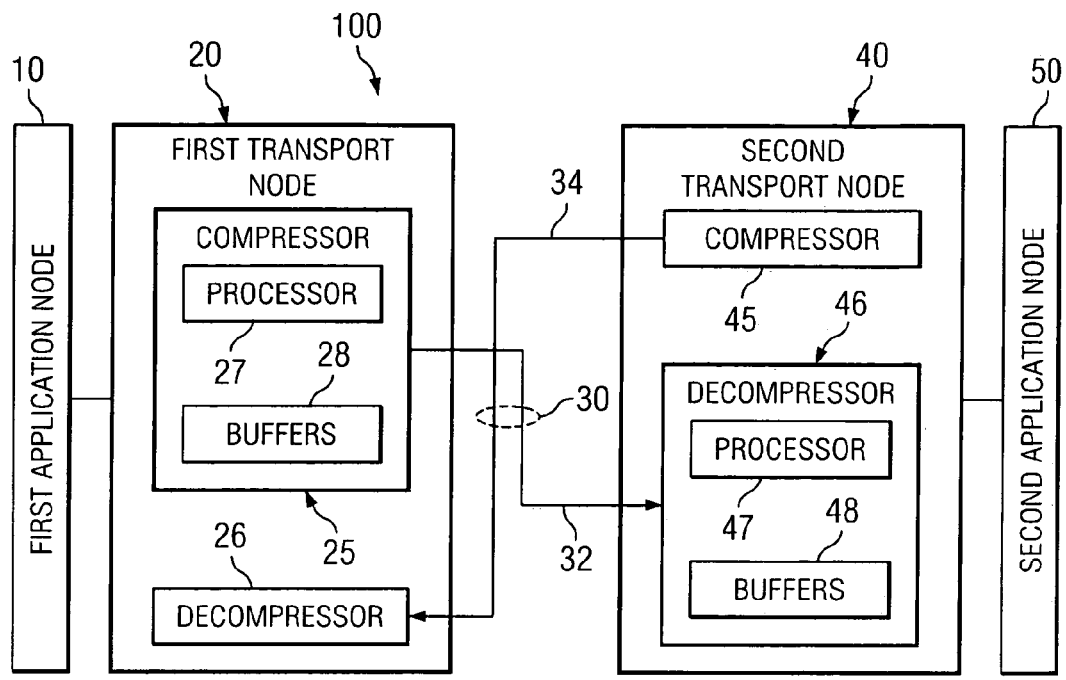
FIG. 1 is a block diagram of one embodiment of a network that may be used in accordance with the present invention.

FIG. 1 is a block diagram illustrating one embodiment of a network 100 that may compress User Datagram Protocol (UDP) packets. In general, network 100 may ignore any changes in a predetermined increment between packet identifiers of successive packets. Ignoring changes may save available bandwidth and may reduce packet loss. Network 100 may synchronize the use of a context identifier (CID) between the compressor and the decompressor, which may reduce or eliminate flow corruption.

According to the illustrated embodiment, network 100 comprises a first application node 10, a first transport node 20, a communication link 30, a second transport node 40, and a second application node 50, coupled as shown in FIG. 1. First application node 10 receives and transmits calls in network 100. First application node 10 may include a base transmitter station (BTS), a base station controller (BSC), a router, a computer, a network, any other suitable telecommunication device for receiving and transmitting calls at network 100, or some, none, or all of the preceding. According to the illustrated embodiment, first application node 10 comprises a BTS operable to send signals to and receive signals from network 100. The signals may include data communication, voice communication, signaling communication, or any other suitable type of communication.

First transport node 20 routes packets at network 100. A data packet comprises a bundle of data organized in a specific way for transmission, and may carry digital, audio, video, multimedia, or other type of information. First transport node 20 may communicate packets between first application node 10 and second transport node 40 through communication link 30. First transport node 20 may comprise one or more routers or any other communication device suitable for receiving and sending data packets.

According to one embodiment, first transport node 20 may comprise a router having Layer 3 and Layer 2 entities. A Layer 3 entity may be associated with routing functions such as classification and queuing. For example, a classification function may include classifying data packets according to predetermined criteria, while a queuing function may include placing packets in an appropriate queue. A Layer 2 entity may include a compressor, a multiplexer, a load balancer, a local call admission control, or other suitable component.

According to the illustrated embodiment, first transport node 20 may include a compressor 25 and a decompressor 26. Compressor 25 compresses data packets received at first transport node 20, and may include a processor 27 operable to manage compression and buffers 28 operable to store packets. According to one embodiment, compressor 25 may comprise an algorithm operable to perform compression operations, and may use any compression operation suitable for compressing packets such as RFC 2508 for IP. Decompressor 26 decompresses data packets received from compressor 45. According to one embodiment, decompressor 26 comprises an algorithm operable to perform decompression operations, and may employ any decompression operation suitable for decompressing packets such as RFC 2508 for IP. According to the illustrated embodiment, decompressor 26 may be synchronized with compressor 45.

Communication link 30 carries communication signals to and from the nodes of network 100. Communication link 30 may comprise any suitable link associated with a public switched telephone network (PSTN), a public or private data network, the Internet, a wireline or wireless network, a local, regional, or global communication network, an enterprise intranet, other suitable communication link, or any combination of the preceding.

According to one embodiment, communication link 30 comprises a multidirectional link between first transport node 20 and second transport node 40. According to the illustrated embodiment, communication link 30 may comprise a portion of a Multi-Link Point to Point (MLPPP) configuration. Any suitable number of links may be included at communication link 30 without departing from the scope of the invention.

According to the illustrated embodiment, communication link 30 includes a first direction flow 32 and a second direction flow 34. First direction flow 32 may carry data packets from first transport node 20 to second transport node 40. First direction flow 32, however, may operate in the reverse direction without departing from the scope of the invention. Second direction flow 34 may carry data packets from second transport node 40 to first transport node 20. The direction of second direction flow 34 may be reversed without departing from the scope of the invention.

Any suitable number of first direction flows 32 and second direction flows 34 may be used without departing from the scope of the invention. For example, first direction flow 32 may represent an uplink direction of communication link 30, while second direction flow 34 may represent a downlink direction of communication link 30. Additional communication links 30 at network 100 may utilize any other suitable uplink and downlink configurations to carry packets to and from the transport nodes.

Second transport node 40 routes packets at network 100. Second transport node 40 may communicate packets between first transport node 20 and second application node 50. Second transport node 40 may be substantially similar to first transport node 20, and may comprise a router. According to the illustrated embodiments, second transport node 40 includes a compressor 45 and a decompressor 46. Compressor 45 may be substantially similar to compressor 25. According to the illustrated embodiment, compressor 45 is operable to transmit compressed packets to decompressor 26 at first transport node 20 through second direction flow 34. Decompressor 46 may be substantially similar to decompressor 26, and may include a processor 47 operable to manage decompression and buffers 48 operable to store packets. Decompressor 46 is operable to receive compressed data packets from compressor 25 of first transport node 20 through first direction flow 32.

Second application node 50 may be substantially similar in operation to first application node 10. According to the illustrated embodiment, second application node 50 comprises a Base Station Controller (BSC) operable to receive and transmit signals at network 100.

Various modifications, additions, or omissions may be made to network 100 without departing from the scope of the invention. For example, first application node 10 and second application node 50 may be omitted. As another example, first transport node 20 and second transport node 40 may be modified to include any suitable number of routers. Additionally, functions may be performed using any suitable logic comprising software, hardware, other logic, or any suitable combination of the preceding. As used in this document, "each" refers to each member of a set or each member of a subset of a set.

Network 100 may have certain advantages over known techniques. RFC 2508 "Compressing IP/UDP/RTP Headers for Low-Speed Serial Links" published by The Internet Society describes a known technique for header compression for Realtime Transport Protocol (RTP) flows according to a compression Realtime Transport Protocol (cRTP), and for compressing User Datagram Protocol (UDPY flows according to a compression User Datagram Protocol (cUDP). During a packet loss event, the RFC 2508 technique of invalidating the context may exacerbate packet loss and decrease bandwidth availability. The RFC 2508 technique may also result in flow corruption if a full header packet of a flow is lost.

According to one embodiment, network 100 may ignore any changes in a predetermined increment between packet identifiers of successive packets and ignore skips in the sequence numbers, that is, tolerate packet loss and continue decompression, which may save available bandwidth and may reduce packet loss. An embodiment of a method for transmitting packets without a packet identifier is described in more detail with reference to FIG. 2. According to another embodiment, network 100 may also synchronize the use of a context identifier between compressor 25 and decompressor 46, which may reduce or eliminate flow corruption. An embodiment of a method for synchronizing the use of a context identifier between compressor 25 and decompressor 46 is described in more detail with reference to FIG. 3.

Figure 2:
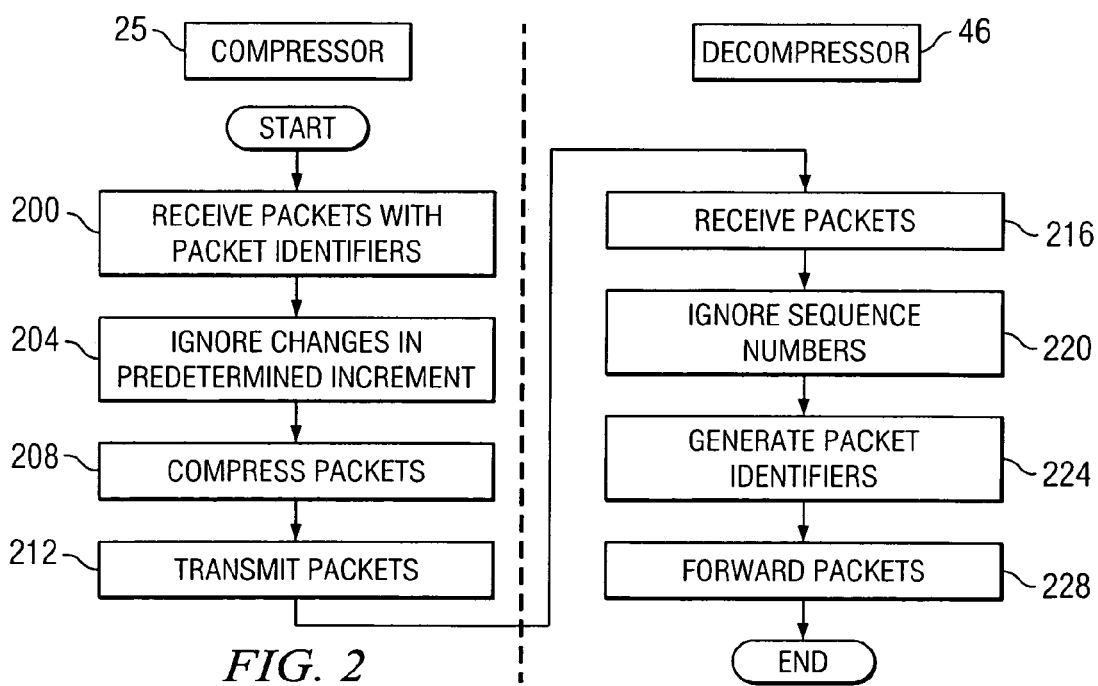
FIG. 2 is a flowchart illustrating one embodiment of a method for transmitting packets without relying on a packet identifier.

FIG. 2 is a flowchart illustrating one embodiment of a method for transmitting packets without preserving a packet identifier such as an Internet Protocol Identifier. According to the embodiment, transmission may be optimized by ignoring a change in a predetermined increment between packet identifiers of successive packets, that is, by not attempting to preserve the packet identifier.

The method begins at step 200, where compressor 25 of first transport node 20 receives packets with packet identifiers. A packet may comprise any suitable packet, and a packet identifier may comprise any label operable to identify a packet. For example, a packet may comprise a User Datagram Protocol packet, and a packet identifier may comprise an Internet Protocol Identifier. Packet identifiers of successive packets may be incremented by a predetermined increment. Compressor 25 ignores any changes in the predetermined increment between packet identifiers of successive packets at step 204. Compressor 25 may ignore changes by not notifying decompressor 46 of the changes, which may provide for more available bandwidth. For example, compressor 25 does not send a delta IP ID, which may be considered as a predetermined increment, even if there is a change in the predetermined increment between packet identifiers of successive packets, which may save one to three bytes of bandwidth per packet.

Compressor 25 compresses the packets at step 208, and first transport node 20 transmits the packets to second transport node 40 at step 212. Decompressor 46 of second transport node 40 receives the packets at step 216. The sequence numbers of the packets are ignored at step 220. A sequence number may comprise any suitable identifier operable to place a packet in a sequence of packets such as a cRTP sequence identifier. Packets may be sequenced according to their order of departure. Regardless of whether the sequence numbers have or do not have skips, the method proceeds to step 224, where packet identifiers are generated for the packets. Since compressor 25 does not notify decompressor 46 of any changes in the predetermined increment, a packet identifier generated by decompressor 46 for a packet might not necessarily match the packet identifier that the packet had at the compressor 25. Accordingly, a packet identifier for a packet entering compressor 25 may differ from the packet identifier for the packet exiting decompressor 46. Decompressor 46 forwards the packets at step 228. After forwarding the packets, the method terminates.

Since the IP ID field, which is not being preserved, is the only field that can be affected, skips in the sequence numbers are acceptable. Accepting skips instead of invalidating a flow may save bandwidth or reduce or eliminate packet loss. Invalidating a flow requires sending a context state packet from decompressor 46 to compressor 25, and then sending an uncompressed full header packet from compressor 25 to decompressor 46, while merely accepting the skips does not. Moreover, in the event that a link nears or exceeds maximum utilization, the embodiment may allow for dropping only the compressed packets that are lost between compressor 25 and decompressor 46 without dropping all packets as directed by the RFC 2508 technique.

The sequence number checking procedure of RFC 2508 typically poses problems. For example, when packet loss occurs, each packet or consecutive packets lost in a flow may cause the next received packet to be dropped, which may double the packet loss of the flow. Moreover, the decompressor sends a context state message to the compressor, which causes the compressor to send a full header packet the next time a packet is received for the flow. The context state and the full header packet each waste bandwidth. Furthermore, any in transit packets of the flow between the time the decompressor invalidates the -flow and the time the compressor processes the context state may also be lost. Additionally, if the packet loss occurs due to link congestion, the context state and full header packets may cause more packet loss, resulting in even more link over subscription and more loss. By eliminating the sequence number checking procedure, and generating an outbound packet identifier at the decompressor, only packets that are lost during transmit from the compressor to the decompressor are lost, and no extra link bandwidth is used for context state and full headers.

Modifications, additions, or omissions may be made to the method without departing from the scope of the invention. Additionally, steps may be performed in any suitable order without departing from the scope of the invention.

Figure 3:
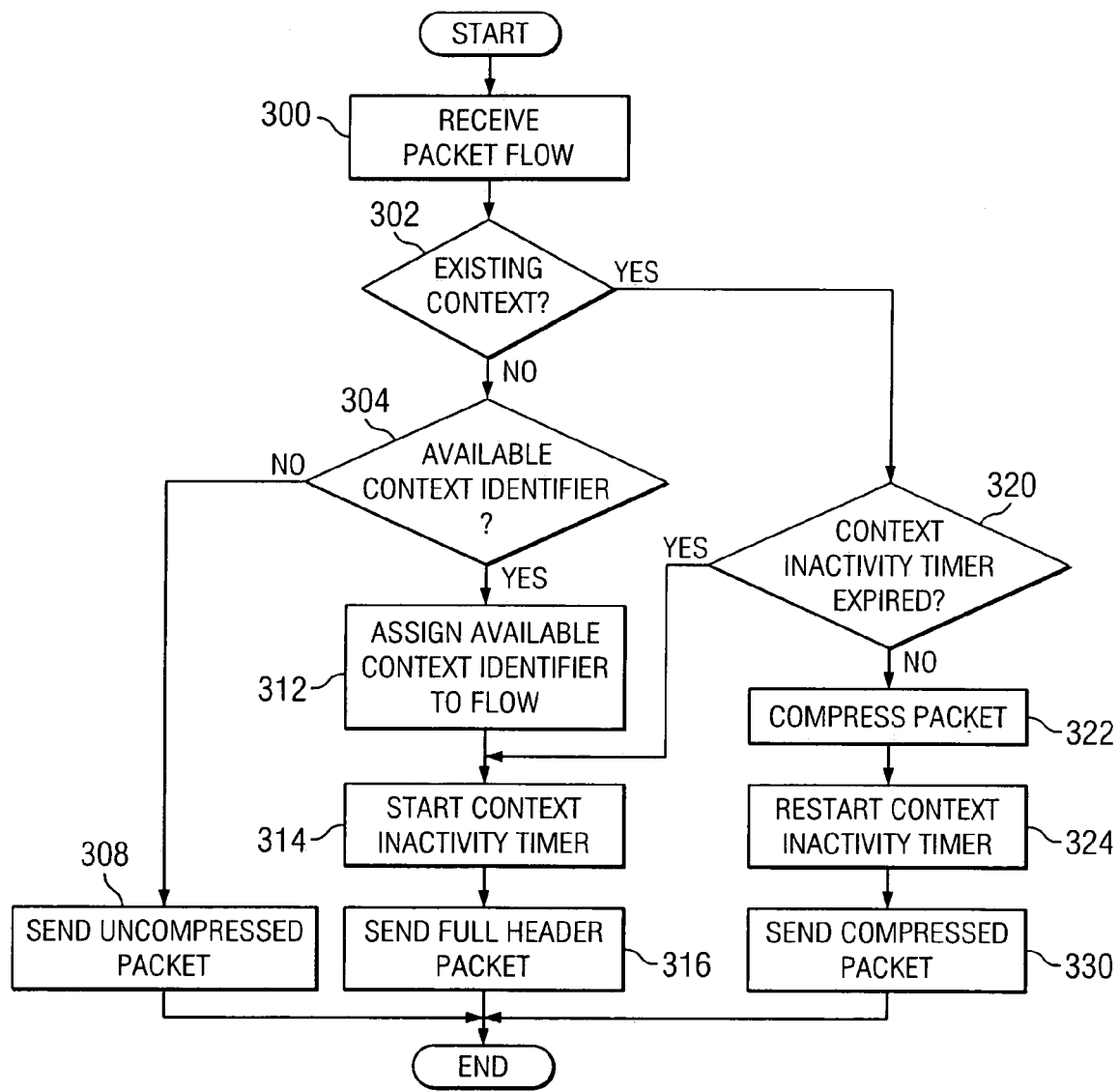
FIGS. 3 through 5 are flowcharts illustrating embodiments of methods for synchronizing the use of a context identifier between a compressor and a decompressor.
Figure 4:
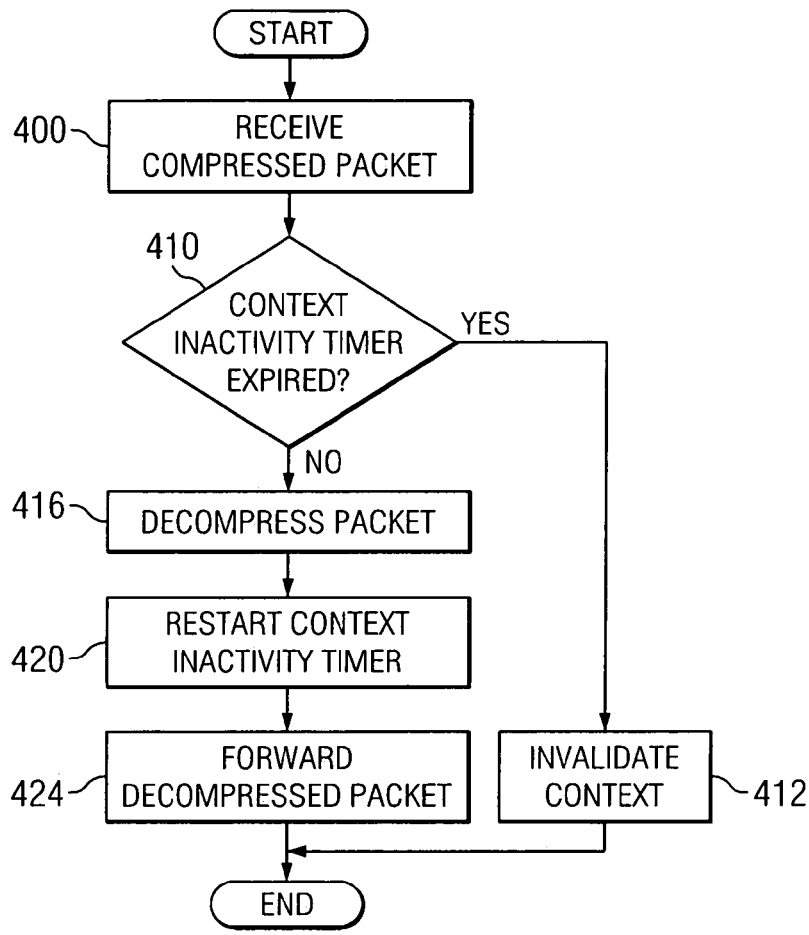
Figure 5:
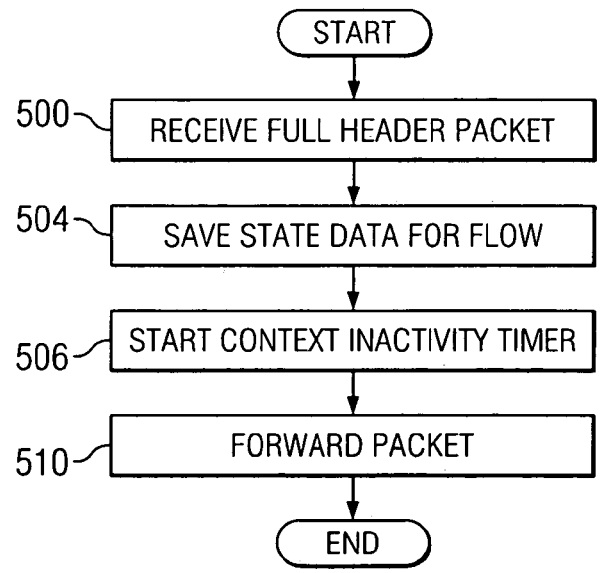

FIGS. 3 through 5 are flowcharts illustrating embodiments of methods for synchronizing the use of a context identifier between compressor 25 and decompressor 46. A context identifier may be used to identify a packet flow, and a full header packet may be used to indicate the use of a context identifier for a new packet flow. According to the embodiment, a context identifier is reserved for a flow as long as the flow is active, that is, currently transmitting packets. Compressor 25 and decompressor 46 monitor flows for inactivity to determine an inactive time of a flow. Once the flow has been inactive for a predetermined maximum allowed inactivity period, its context identifier expires and the flow must restart compression by sending a full header packet. Expired context identifiers are free to be reused for the compression of new flows.

Without synchronization between compressor 25 and decompressor 46, if a full header packet of a new flow is lost, a compressed packet of the new flow may be incorrectly interpreted by decompressor 46 as belonging to an old flow, resulting in flow corruption. According to the embodiment, flow corruption may be reduced or eliminated. The method may be used with any suitable compression technique such as the compression technique of RFC 2508 or the embodiment of the method for transmitting packets described with reference to FIG. 2.

Referring to FIG. 3, one method begins at step 300, where compressor 25 of first transport node 20 receives a flow of packets. If the flow is not associated with an existing context at step 302, the method proceeds to step 304. Compressor 25 checks whether there is an available context identifier at step 304. An available context identifier may refer to a context identifier that, although may have been used in the past, is available for reuse. If there is no available context. identifier, the method proceeds to step 308, where uncompressed packets are sent to second transport node 40. After sending the uncompressed packets, the method terminates.

If there is an available context identifier, the method proceeds to step 312, where the available context identifier is assigned to the packet flow. A context inactivity timer for compressor 25 is started at step 314. The context inactivity timer measures the inactivity time for a context. A full header packet is sent at step 316. A full header packet may be sent prior to the compressed packets to indicate that the context identifier is being used for a new flow. After sending the full header packet, the method terminates.

If the flow is associated with an existing context at step 302, the method proceeds to step 320. If the context inactivity timer has expired at step 320, the method proceeds to step 314, where the context inactivity timer is started. If the context inactivity timer has not expired at step 320, the method proceeds to step 322, where compressor 25 compresses the packets. The context inactivity timer is restarted at step 324. First transport node 20 sends the compressed packet to second transport node 40 at step 330. After sending the compressed packet, the method terminates.

Referring to FIG. 4, one method begins at step 400, where decompressor 46 receives a compressed packet of a flow having a context identifier associated with a context. A context inactivity timer at decompressor 46 measures the inactivity time for the context. If the context inactivity timer has expired, decompressor 46 expects a full header packet for the expired context identifier instead of compressed packets. Since decompressor 46 received compressed packets, decompressor 46 determines that the full header packet is lost. Accordingly, if the context inactivity timer has expired at step 410, the method proceeds to step 412. Decompressor 46 drops the compressed packet and invalidates the context at step 412. After invalidating the context, the method terminates.

If the context inactivity timer has not expired at step 410, the method proceeds to step 416, where packets are decompressed. The context inactivity timer is restarted at step 420. The decompressed packet is forwarded at step 242. After forwarding the packet, the method terminates.

Referring to FIG. 5, one method begins at step 500, where decompressor 46 receives a full header packet of a flow having a context identifier associated with a context. The state data for the flow is saved according to the context identifier at step 504. The context inactivity timer of decompressor 46 is started at step 506. Decompressor 46 forwards the packet at step 510. After forwarding the packet, the method terminates.

To summarize, compressor 25 and decompressor 46 synchronize their reuse of context identifiers by using synchronized expiration times. A context identifier is reused only if decompressor 46 expects a new flow with the context identifier, and if compressor 25 and decompressor 46 know that the context identifier is free to be reused for a new flow. Compressor 25 and decompressor 46 use synchronized expiration times. When a context identifier expires and becomes available at compressor 25, decompressor 46 knows that the context identifier has expired and expects a full header packet indicating that the context identifier is being used for a new flow. According to one embodiment, a flow may be required to restart compression at the end of a maximum allowed inactivity period that occurs prior to the expiration of the context identifier at the end of an expiration period. The requirement may reduce the probability of the expiration of a context identifier of a flow while the packets are traveling between compressor 25 and decompressor 46.

According to one example, decompressor 46 may use an expiration period ET, and compressor 25 may use the expiration period adjusted by a delta time dT. According to one embodiment, the expiration period ET may be based upon F_MAX_TIME of RFC 2509, and delta time dT may be based on the average time it takes a packet to travel from compressor 25 to decompressor 46. At compressor 25, a maximum allowed inactivity period may be defined as ET−dT, and a context identifier expiration period may be defined as ET+dT. If a flow is inactive for more than the maximum allowed inactivity period ET−dT at compressor 25, the flow must restart compression. The context identifier expires at compressor 25 after ET+dT. Optimization may be achieved by allowing a flow that was inactive more than ET−dT but less than an ET to continue to use its own context identifier, while sending a full header packet. If the full header packet is lost but the next packet still arrives at decompressor 46 before the context identifier expires at decompressor 46, the context is still valid and compression may continue for the flow.

Modifications, additions, or omissions may be made to the method without departing from the scope of the invention. Additionally, steps may be performed in any suitable order without departing from the scope of the invention.

Certain embodiments of the invention may provide one or more technical advantages. A technical advantage of one embodiment may be that any changes in a predetermined increment between packet identifiers of successive packets may be ignored, which may save available bandwidth and may reduce packet loss. Another technical advantage of one embodiment may be that the use of a context identifier between the compressor and the decompressor may be synchronized, which may reduce flow or eliminate corruption.

Although an embodiment of the invention and its advantages are described in detail, a person skilled in the art could make various alterations, additions, and omissions without departing from the spirit and scope of the present invention as defined by the appended claims.

What is claimed is:

1. A method for performing compression, comprising:
 receiving at a compressor a flow comprising a plurality of packets, each packet having a packet identifier, the packet identifiers associated with a predetermined increment;
 ignoring a change in the predetermined increment associated with the packet identifiers;
 compressing the plurality of packets;
 transmitting the flow to a decompressor; and
 determining that an inactive time associated with the flow has exceeded a maximum allowed inactivity period, the flow having a context identifier.

2. The method of claim 1, further comprising:
 receiving the flow at the decompressor, each packet of the flow having a sequence number;
 detecting a skip in the sequence numbers of the plurality of packets of the flow; and
 accepting the flow having the skip in the sequence numbers.

3. The method of claim 1, further comprising:
 establishing that the flow comprises a compressed packet in the place of a full header packet; and
 establishing that the full header packet is lost.

4. The method of claim 1, further comprising:
 determining at the compressor that a previous inactive time of a previous flow has exceeded a previous maximum allowed inactivity period, the previous flow associated with a context identifier;
 establishing that the context identifier is available; and
 assigning the context identifier to the flow in response to establishing that the context identifier is available.

5. The method of claim 1, further comprising:
 determining at the compressor that a previous inactive time of a previous flow has exceeded a previous maximum allowed inactivity period, the previous flow associated with a context identifier, the previous inactive time exceeding the previous maximum allowed inactivity period prior to exceeding an expiration period; and
 establishing that the context identifier is available.

6. The method of claim 1, further comprising:
 establishing that a context identifier is available;
 assigning the context identifier to the flow;
 appending a full header packet corresponding to the context identifier to the flow; and
 transmitting the flow to the decompressor.

7. A system for performing compression, comprising:
 a compressor operable to:
  receive a flow comprising a plurality of packets, each packet having a packet identifier, the packet identifiers associated with a predetermined increment;
  ignore a change in the predetermined increment associated with the packet identifiers;
  compress the plurality of packets; and
  transmit the flow; and
 a decompressor coupled to the compressor operable to decompress the flow; and further operable to:
  determine that an inactive time associated with the flow has exceeded a maximum allowed inactivity period, the flow having a context identifier.

8. The system of claim 7, the decompressor further operable to:
 receive the flow, each packet of the flow having a sequence number;
 detect a skip in the sequence numbers of the plurality of packets of the flow; and
 accept the flow having the skip in the sequence numbers.

9. The system of claim 7, the decompressor further operable to:
 establish that the flow comprises a compressed packet in the place of a full header packet; and
 establish that the full header packet is lost.

10. The system of claim 7, the compressor further operable to:
 determine that a previous inactive time of a previous flow has exceeded a previous maximum allowed inactivity period, the previous flow associated with a context identifier;
 establish that the context identifier is available; and
 assign the context identifier to the flow in response to establishing that the context identifier is available.

11. The system of claim 7, the compressor further operable to:
  determine that a previous inactive time of a previous flow has exceeded a previous maximum allowed inactivity period, the previous flow associated with a context identifier, the previous inactive time exceeding the previous maximum allowed inactivity period prior to exceeding an expiration period; and
  establish that the context identifier is available.

12. The system of claim 7, the compressor further operable to:
  establish that a context identifier is available;
  assign the context identifier to the flow;
  append a full header packet corresponding to the context identifier to the flow; and
  transmit the flow to the decompressor.

13. Logic for performing compression, the logic embodied in a medium and operable to:
  receive at a compressor a flow comprising a plurality of packets, each packet having a packet identifier, the packet identifiers associated with a predetermined increment;
  ignore a change in the predetermined increment associated with the packet identifiers;
  compress the plurality of packets;
  transmit the flow to a decompressor; and
  determine that an inactive time associated with the flow has exceeded a maximum allowed inactivity period, the flow having a context identifier.

14. The logic of claim 13, further operable to:
  receive the flow at the decompressor, each packet of the flow having a sequence number;
  detect a skip in the sequence numbers of the plurality of packets of the flow; and
  accept the flow having the skip in the sequence numbers.

15. The logic of claim 13, further operable to:
  establish that the flow comprises a compressed packet in the place of a full header packet; and
  establish that the full header packet is lost.

16. The logic of claim 13, further operable to:
  determine at the compressor that a previous inactive time of a previous flow has exceeded a previous maximum allowed inactivity period, the previous flow associated with a context identifier;
  establish that the context identifier is available; and
  assign the context identifier to the flow in response to establishing that the context identifier is available.

17. The logic of claim 13, further operable to:
  determine at the compressor that a previous inactive time of a previous flow has exceeded a previous maximum allowed inactivity period, the previous flow associated with a context identifier, the previous inactive time exceeding the previous maximum allowed inactivity period prior to exceeding an expiration period; and
  establish that the context identifier is available.

18. The logic of claim 13, further operable to:
  establish that a context identifier is available;
  assign the context identifier to the flow;
  append a full header packet corresponding to the context identifier to the flow; and
  transmit the flow to the decompressor.

19. A method for performing compression, comprising:
  receiving at a compressor a flow comprising a plurality of packets, each packet having a packet identifier, the packet identifiers associated with a predetermined increment;
  ignoring a change in the predetermined increment associated with the packet identifiers;
  compressing the plurality of packets;
  transmitting the flow to a decompressor;
  receiving the flow at the decompressor, each packet of the flow having a sequence number;
  detecting a skip in the sequence numbers of the plurality of packets of the flow;
  accepting the flow having the skip in the sequence numbers;
  determining that an inactive time associated with the flow has exceeded a maximum allowed inactivity period, the flow having a context identifier;
  establishing that the flow comprises a compressed packet in the place of a full header packet; and
  establishing that the full header packet is lost.

20. A system for performing compression, comprising:
  means for receiving at a compressor a flow comprising a plurality of packets, each packet having a packet identifier, the packet identifiers associated with a predetermined increment;
  means for ignoring a change in the predetermined increment associated with the packet identifiers;
  means for compressing the plurality of packets;
  means for transmitting the flow to a decompressor; and
  means for determining that a previous inactive time of a previous flow has exceeded a previous maximum allowed inactivity period, the previous flow associated with a context identifier.

21. A method for performing compression, comprising:
  receiving at a compressor a flow comprising a plurality of packets, each packet having a packet identifier, the packet identifiers associated with a predetermined increment;
  ignoring a change in the predetermined increment associated with the packet identifiers;
  determining at the compressor that a previous inactive time of a previous flow has exceeded a previous maximum allowed inactivity period, the previous flow associated with a context identifier, the previous inactive time exceeding the previous maximum allowed inactivity period prior to exceeding an expiration period;
  establishing that the context identifier is available;
  assigning the context identifier to the flow in response to establishing that the context identifier is available;
  appending a full header packet corresponding to the context identifier to the flow;
  compressing the plurality of packets;
  transmitting the flow to a decompressor;
  receiving the flow at the decompressor, each packet of the flow having a sequence number;
  detecting a skip in the sequence numbers of the plurality of packets of the flow;
  accepting the flow having the skip in the sequence numbers;
  determining that an inactive time associated with the flow has exceeded a maximum allowed inactivity period, the flow having a context identifier;
  establishing that the flow comprises a compressed packet in the place of the full header packet; and
  establishing that the full header packet is lost.

* * * * *